US012664660B2

(12) United States Patent
Shen

(10) Patent No.: US 12,664,660 B2
(45) Date of Patent: Jun. 23, 2026

(54) SYSTEMS AND METHODS FOR IMAGE PROCESSING

(71) Applicant: SHANGHAI UNITED IMAGING HEALTHCARE CO., LTD., Shanghai (CN)

(72) Inventor: Jianhua Shen, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 300 days.

(21) Appl. No.: 18/345,059

(22) Filed: Jun. 30, 2023

(65) Prior Publication Data

US 2023/0342940 A1 Oct. 26, 2023

Related U.S. Application Data

(63) Continuation of application No. PCT/CN2021/142060, filed on Dec. 28, 2021.

(30) Foreign Application Priority Data

Dec. 30, 2020 (CN) .......................... 202011626053.6

(51) Int. Cl.
*G06T 7/11* (2017.01)
*G06T 7/187* (2017.01)

(52) U.S. Cl.
CPC ............... *G06T 7/11* (2017.01); *G06T 7/187* (2017.01); *G06T 2207/20081* (2013.01);
(Continued)

(58) Field of Classification Search
CPC ... G06T 7/11; G06T 7/187; G06T 7/60; G06T 2207/20081; G06T 2207/20101; G06T 2207/30101; G06T 2207/30172
See application file for complete search history.

(56) References Cited

U.S. PATENT DOCUMENTS

2007/0025616 A1* 2/2007 Grady .................. G06V 10/267
382/173
2007/0031019 A1* 2/2007 Lesage ..................... G06T 7/60
382/173
(Continued)

FOREIGN PATENT DOCUMENTS

CN 109544566 A 3/2019
CN 111312374 A 6/2020
(Continued)

OTHER PUBLICATIONS

Gülsün et al. "Coronary centerline extraction via optimal flow paths and CNN path pruning." International Conference on Medical Image Computing and Computer-Assisted Intervention. Cham: Springer International Publishing, 2016. (Year: 2016).*

(Continued)

*Primary Examiner* — Katrina R Fujita
(74) *Attorney, Agent, or Firm* — METIS IP LLC

(57) ABSTRACT

The present disclosure provides image processing systems and methods. An image processing method may include identifying a target region of an image, wherein the target region includes a tubular structure to be segmented; constructing a distance field of the target region based on a trained model, wherein the distance field includes elements each of which is associated with a distance between the element and a predicted centerline of the tubular structure; and segmenting the tubular structure to obtain a segmented tubular structure based on the distance field and an optimum path algorithm.

19 Claims, 9 Drawing Sheets

500

(52) U.S. Cl.
CPC .............. *G06T 2207/20101* (2013.01); *G06T 2207/30101* (2013.01); *G06T 2207/30172* (2013.01)

(56) References Cited

U.S. PATENT DOCUMENTS

| | | | |
|---|---|---|---|
| 2012/0128219 A1 | 5/2012 | Thomas Bernard Pascal et al. | |
| 2017/0109880 A1* | 4/2017 | Al-Kofahi | G06T 11/008 |
| 2017/0154435 A1 | 6/2017 | Bitter et al. | |
| 2017/0258433 A1* | 9/2017 | Gulsun | A61B 6/5217 |
| 2018/0000441 A1 | 1/2018 | Wang et al. | |
| 2018/0114313 A1 | 4/2018 | Feng et al. | |
| 2018/0182101 A1* | 6/2018 | Petersen | G06T 7/60 |
| 2020/0065989 A1* | 2/2020 | Bai | G06N 3/045 |
| 2021/0183054 A1* | 6/2021 | Guo | G06T 7/0012 |

FOREIGN PATENT DOCUMENTS

| | | |
|---|---|---|
| WO | 2008050223 A2 | 5/2008 |
| WO | 2018023917 A1 | 2/2018 |
| WO | 2020211293 A1 | 10/2020 |

OTHER PUBLICATIONS

Tetteh et al. "DeepVesselNet: Vessel Segmentation, Centerline Prediction, and Bifurcation Detection in 3-D Angiographic Volumes." arXiv preprint arXiv:1803.09340 (2019). (Year: 2019).*

Yao, et al. "Graph convolutional network based point cloud for head and neck vessel labeling." International Workshop on Machine Learning in Medical Imaging. Cham: Springer International Publishing, Sep. 2020. (Year: 2020).*

International Search Report in PCT/CN2021/142060 mailed on Mar. 30, 2022, 5 pages.

Written Opinion in PCT/CN2021/142060 mailed on Mar. 30, 2022, 3 pages.

Thomas Deschamps et al., Fast Extraction Of Minimal Paths In 3D Images And Applications to Virtual Endoscopy, Medical Image Analysis, 5: 281-299, 2001.

Hüseyin Tek et al., Automatic Coronary Tree Modeling, Siemens Corporate Research of Princeton, 2008, 8pages.

Jiang, Jinlu, Research on Coronary Artery Centerline Extraction and Stenosis Detection, Full-text Database of Excellent Master's Dissertations in China (Medical and Health Science and Technology Series), 2019, 70 pages.

Chen, Tian, Research on DSA Brain Vessel Segmentation Based on Centerline Extraction, Wanfang Data, 2014, 109 pages.

* cited by examiner

<u>300</u>

500

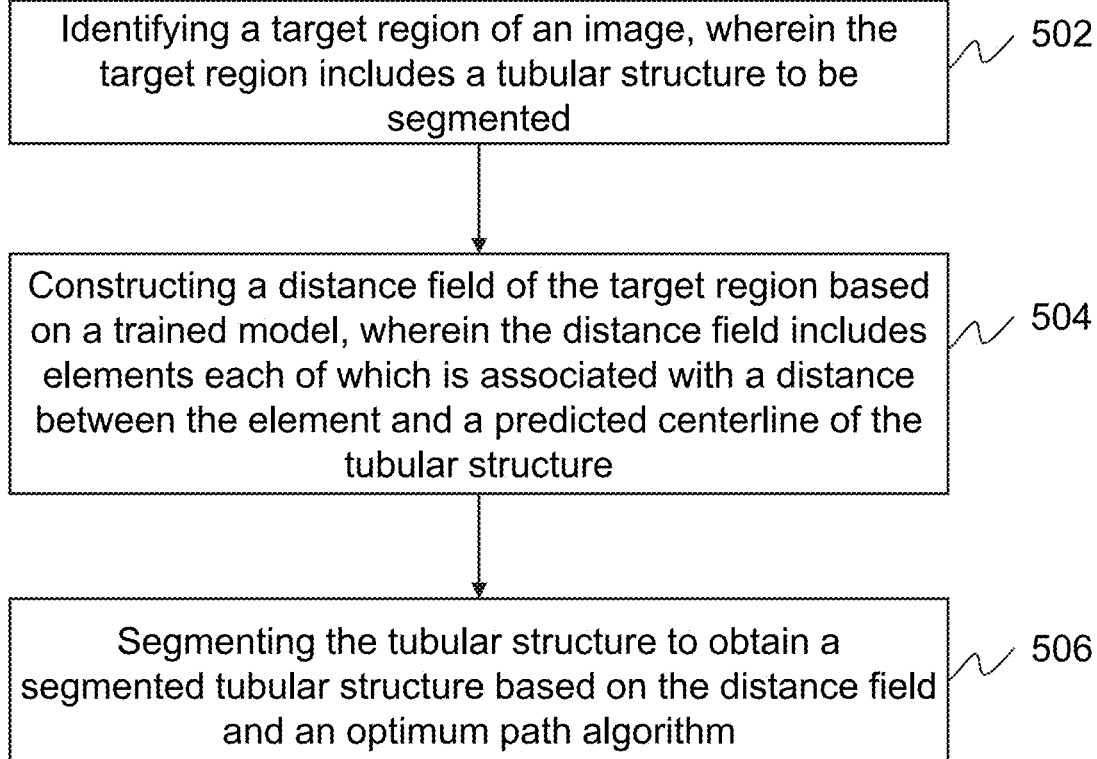

Identifying a target region of an image, wherein the target region includes a tubular structure to be segmented          502

Constructing a distance field of the target region based on a trained model, wherein the distance field includes elements each of which is associated with a distance between the element and a predicted centerline of the tubular structure          504

Segmenting the tubular structure to obtain a segmented tubular structure based on the distance field and an optimum path algorithm          506

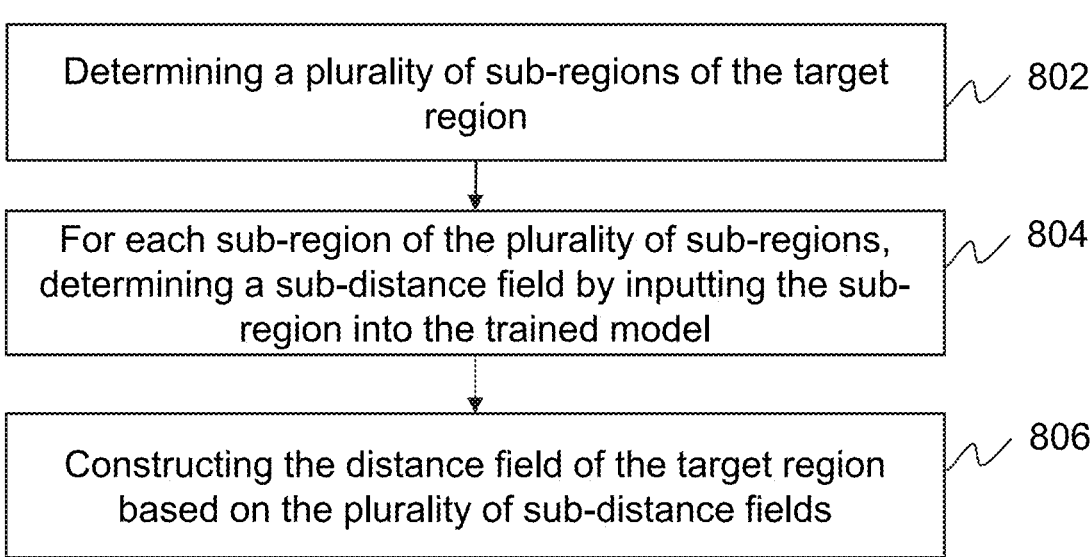

Determining a plurality of sub-regions of the target region        802

For each sub-region of the plurality of sub-regions, determining a sub-distance field by inputting the sub-region into the trained model        804

Constructing the distance field of the target region based on the plurality of sub-distance fields        806

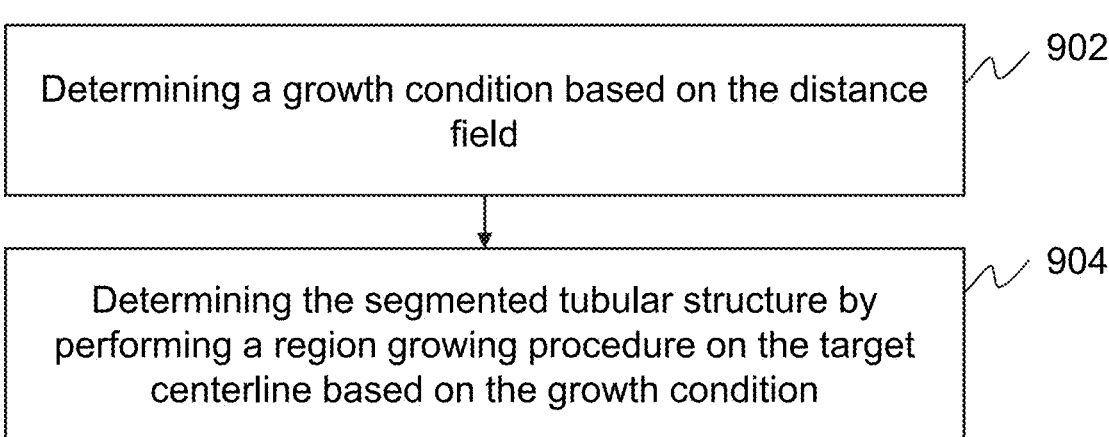

Determining a growth condition based on the distance field        902

Determining the segmented tubular structure by performing a region growing procedure on the target centerline based on the growth condition        904

FIG. 9

1000
Obtaining a plurality of training sample sets each of which includes a sample image and a sample distance field of the sample image ⟋ 1002
Obtaining the trained model by training a preliminary model based on the plurality of training sample sets ⟋ 1004
FIG. 10
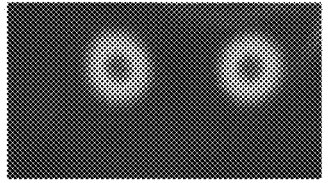 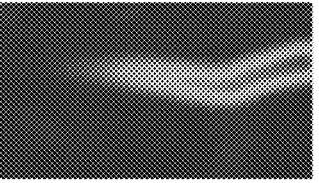 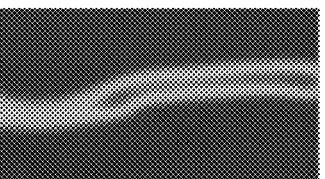
FIG. 11

SYSTEMS AND METHODS FOR IMAGE PROCESSING

CROSS-REFERENCE TO RELATED APPLICATIONS

This application is a Continuation of International Application No. PCT/CN2021/142060, filed on Dec. 28, 2021, which claims priority to Chinese Application No. 202011626053.6, filed on Dec. 30, 2020, the contents of which are incorporated herein by reference.

TECHNICAL FIELD

The disclosure generally relates to systems and methods for processing images, and more particularly relates to systems and methods for image segmentation.

BACKGROUND

Image segmentation, especially the segmentation of tubular structures (e.g., a blood vessel, a trachea, a coronary artery, etc.) in images, plays an important role in the medical field. Conventional techniques for segmenting tubular structures (e.g., a coronary artery) usually involve automatic coronary artery segmentation algorithms using a fast marching technique or an optimal path algorithm. However, it is difficult to segment a coronary artery around some positions, such as a bifurcation of the coronary artery, the adherence of veins, etc., using the conventional methods. Thus, it is desired to provide systems and methods for segmenting tubular structures accurately and effectively.

SUMMARY

According to a first aspect of the present disclosure, a system for processing an image is provided. The system may include at least one storage device storing executable instructions, and at least one processor in communication with the at least one storage device. When executing the executable instructions, the at least one processor may cause the system to perform one or more of the following operations. The operations may include: identifying a target region of an image, wherein the target region includes a tubular structure to be segmented; constructing a distance field of the target region based on a trained model, wherein the distance field includes elements each of which is associated with a distance between the element and a predicted centerline of the tubular structure; and segmenting the tubular structure to obtain a segmented tubular structure based on the distance field and an optimum path algorithm.

In some embodiments, the identifying the target region of the image may include: obtaining at least one seed point, wherein the at least one seed point is input by a user via a user terminal; and identifying the target region based on the at least one seed point.

In some embodiments, the segmenting the tubular structure to obtain the segmented tubular structure based on the distance field and the optimum path algorithm may include: determining a target centerline of the tubular structure based on the distance field and the optimum path algorithm; and segmenting the tubular structure to obtain the segmented tubular structure based on the target centerline and the distance field.

In some embodiments, the determining the target centerline of the tubular structure based on the distance field and the optimum path algorithm may include: determining, based on the distance field and the optimum path algorithm, an optimum path including the at least one seed point; and designating the optimum path as the target centerline of the tubular structure.

In some embodiments, the segmenting the tubular structure to obtain the segmented tubular structure based on the target centerline and the distance field may include: determining a growth condition based on the distance field; and determining the segmented tubular structure by performing a region growing procedure on the target centerline based on the growth condition.

In some embodiments, the constructing the distance field of the target region based on the trained model may include: determining a plurality of sub-regions of the target region; for each sub-region of the plurality of sub-regions, determining a sub-distance field by inputting the sub-region into the trained model; and constructing the distance field of the target region based on the plurality of sub-distance fields.

In some embodiments, the operations may further include: determining an optimum segmented tubular structure by processing the segmented tubular structure.

In some embodiments, the trained model may be obtained by a process including: obtaining a plurality of training sample sets each of which includes a sample image and a sample distance field of the sample image; and obtaining the trained model by training a preliminary model based on the plurality of training sample sets.

In some embodiments, the obtaining the plurality of training sample sets may include: obtaining a plurality of sample images; for each sample image of the plurality of sample images, determining a sample distance filed.

In some embodiments, for each sample image of the plurality of sample images, the determining the sample distance field may include: for each sample image of the plurality of sample images, determining a sample original segmented tubular structure; determining a sample processed segmented tubular structure by processing the sample original segmented tubular structure; and determining the sample distance field based on the sample processed segmented tubular structure.

In some embodiments, the trained model may include a Vnet model.

According to a second aspect of the present disclosure, a method for processing an image is provided. The method may include: identifying a target region of an image, wherein the target region includes a tubular structure to be segmented; constructing a distance field of the target region based on a trained model, wherein the distance field includes elements each of which is associated with a distance between the element and a predicted centerline of the tubular structure; and segmenting the tubular structure to obtain a segmented tubular structure based on the distance field and an optimum path algorithm.

According to a third aspect of the present disclosure, a non-transitory readable medium is provided. The non-transitory readable medium may include at least one set of instructions for processing an image. When executed by at least one processor of an electrical device, the at least one set of instructions may direct the at least one processor to perform a method. The method may include: identifying a target region of an image, wherein the target region includes a tubular structure to be segmented; constructing a distance field of the target region based on a trained model, wherein the distance field includes elements each of which is associated with a distance between the element and a predicted centerline of the tubular structure; and segmenting the tubular structure to obtain a segmented tubular structure based on the distance field and an optimum path algorithm.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not scaled. These embodiments are non-limiting exemplary embodiments, in which like reference numerals represent similar structures throughout the several views of the drawings, and wherein:

FIG. 5 is a flowchart illustrating an exemplary process for processing an image according to some embodiments of the present disclosure;

FIG. 8 is a flowchart illustrating an exemplary process for constructing a distance field of a target region according to some embodiments of the present disclosure;

FIG. 9 is a flowchart illustrating an exemplary process for determining a segmented tubular structure according to some embodiments of the present disclosure;

FIG. 10 is a flowchart illustrating an exemplary process for obtaining a trained model according to some embodiments of the present disclosure;

FIG. 11 illustrates exemplary sample distance fields according to some embodiments of the present disclosure;

DETAILED DESCRIPTION

Figure 1:
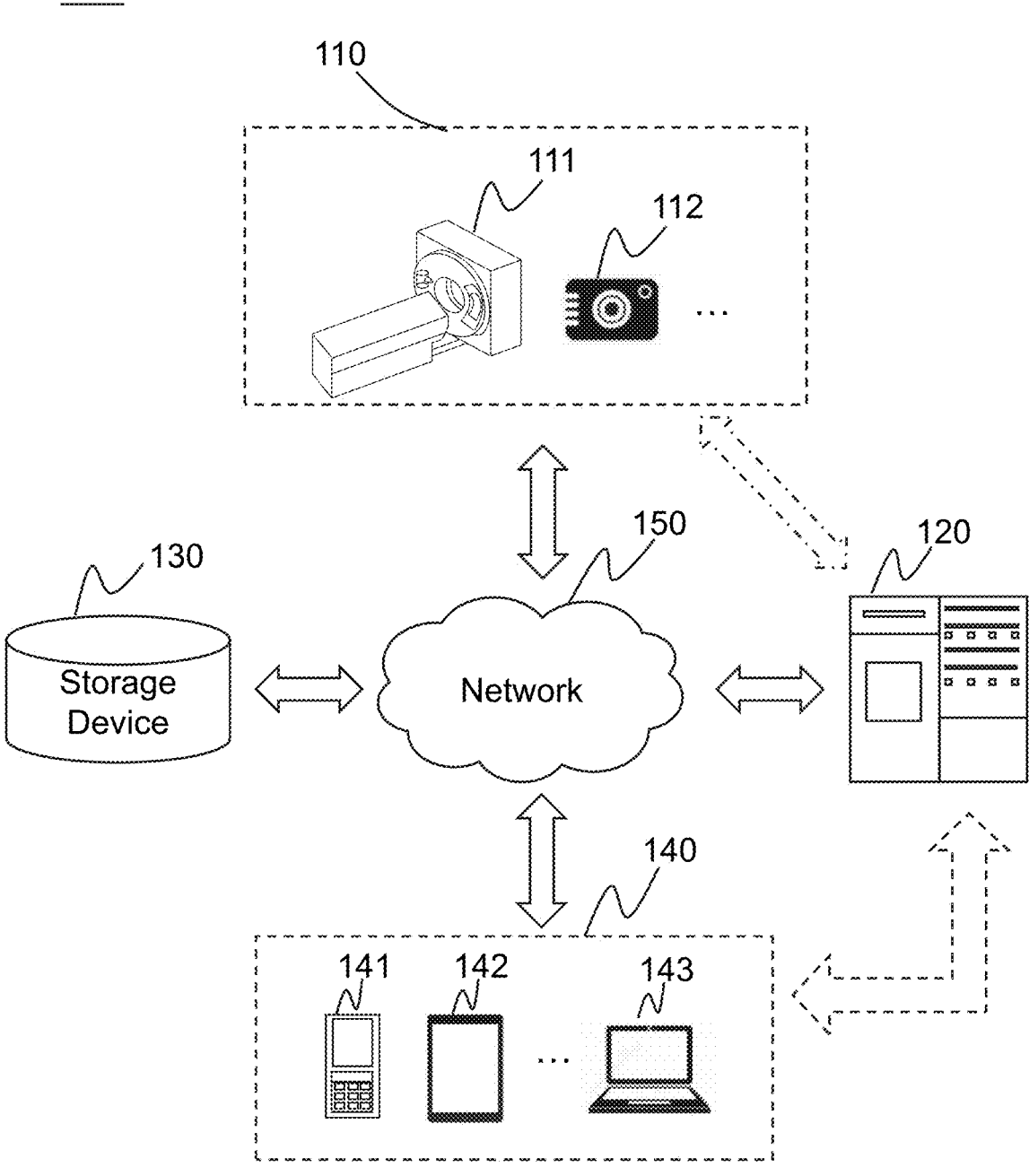
FIG. 1 is a schematic diagram illustrating an exemplary image processing system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that the term "system," "engine," "unit," "module," and/or "block" used herein are one method to distinguish different components, elements, parts, sections, or assembly of different levels in ascending order. However, the terms may be displaced by another expression if they achieve the same purpose.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description regarding the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in an inverted order, or simultaneously. Moreover, one or more other operations may be added to the flowcharts. One or more operations may be removed from the flowcharts.

An aspect of the present disclosure relates to image processing systems and methods The systems and methods may apply a trained model to construct a distance field of a target region of an image, and segment a tubular structure of the image based on the distance field and an optimum path algorithm. The distance field may include elements each of which is associated with a distance between the element and a predicted centerline of the tubular structure. According to the present disclosure, the trained model may predict an accurate distance field. Further, using the combination of the accurate distance field and the optimum path algorithm, the tubular structure may be segmented accurately, especially around some positions, such as a bifurcation of the coronary artery, the adherence of veins, etc.

FIG. 1 is a schematic diagram illustrating an exemplary imaging system 100 according to some embodiments of the present disclosure. The imaging system 100 may include an image acquisition device 110, a processing device 120, a storage device 130, one or more terminals 140, and a network 150. The components in the imaging system 100 may be connected in one or more of various ways. Merely by way of example, the image acquisition device 110 may be connected to the processing device 120 through the network 150. As another example, the image acquisition device 110 may be connected to the processing device 120 directly as illustrated in FIG. 1. As a further example, the terminal(s) 140 may be connected to another component of the imaging system 100 (e.g., the processing device 120) via the network 150. As still a further example, the terminal(s) 140 may be connected to the processing device 120 directly as illustrated by the dotted arrow in FIG. 1. As still a further example, the storage device 130 may be connected to another component of the imaging system 100 (e.g., the processing device 120) directly as illustrated in FIG. 1, or through the network 150.

The image acquisition device 110 may be configured to acquire image data of a subject. The image data of the subject may include an image (e.g., an image slice), projection data, or the like, or a combination thereof. In some embodiments, the image data may be two-dimensional (2D) image data, three-dimensional (3D) image data, four-dimensional (4D) image data (e.g., a series of 3D image data over time), or the like, or any combination thereof. The subject may be biological or non-biological. For example, the subject may include a human, a man-made object, etc., or a portion thereof. In some embodiments, the image acquisition device 110 may include a medical imaging device 111, a camera 112, etc. In some embodiments, the medical imaging device 111 may include a computed tomography (CT) device (e.g., a cone beam CT (CBCT) device, a fan beam CT (FBCT) device, a multi-slice CT (MSCT) device, etc.), a magnetic resonance imaging (MRI) device, an ultrasound imaging device, a fluoroscopy imaging device, a single-photon emission computed tomography (SPECT) device, a positron emission tomography (PET) device, an X-ray imaging device, or the like, or any combination thereof.

Figure 2:
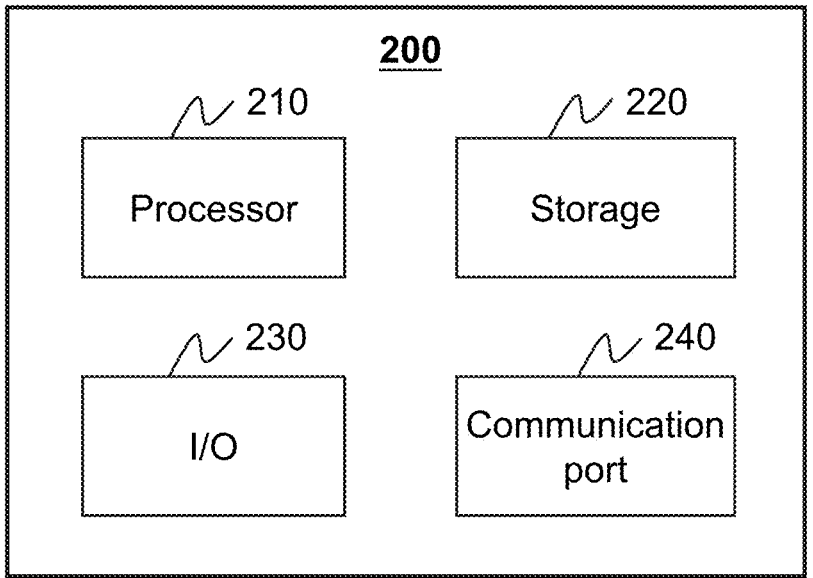
FIG. 2 is a schematic diagram illustrating hardware and/or software components of an exemplary computing device on which the processing device may be implemented according to some embodiments of the present disclosure.

The processing device 120 may process data and/or information obtained from the image acquisition device 110, the terminal(s) 140, and/or the storage device 130. For example, the processing device 120 may identify a target region of an image that includes a tubular structure to be segmented. As another example, the processing device 120 may construct a distance field of the target region based on a trained model. As still another example, the processing device 120 may segment the tubular structure to obtain a segmented tubular structure based on the distance field and an optimum path algorithm. In some embodiments, the processing device 120 may be a computer, a user console, a single server or a server group, etc. The server group may be centralized or distributed. In some embodiments, the processing device 120 may be local or remote. For example, the processing device 120 may access information and/or data stored in the image acquisition device 110, the terminal(s) 140, and/or the storage device 130 via the network 150. As another example, the processing device 120 may be directly connected to the image acquisition device 110, the terminal(s) 140, and/or the storage device 130 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented by a computing device 200 having one or more components as illustrated in FIG. 2.

The storage device 130 may store data, instructions, and/or any other information. In some embodiments, the storage device 130 may store data obtained from the image acquisition device 110, the terminal(s) 140, and/or the processing device 120. For example, the storage device 130 may store image data acquired by the image acquisition device 110. As another example, the storage device 130 may store a trained model that is used for constructing a distance field. In some embodiments, the storage device 130 may store data and/or instructions that the processing device 120 may execute or use to perform exemplary methods/systems described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the imaging system 100 (e.g., the processing device 120, the terminal(s) 140, etc.). One or more components in the imaging system 100 may access the data or instructions stored in the storage device 130 via the network 150. In some embodiments, the storage device 130 may be directly connected to or communicate with one or more other components in the imaging system 100 (e.g., the processing device 120, the terminal(s) 140, etc.). In some embodiments, the storage device 130 may be part of the processing device 120.

The terminal(s) 140 may enable user interaction between a user and the imaging system 100. In some embodiments, the terminal(s) 140 may be connected to and/or communicate with the image acquisition device 110, the processing device 120, the terminal(s) 140, and/or the storage device 130. For example, the terminal(s) 140 may display the segmented tubular structure. The terminal(s) 140 may include a mobile device 141, a tablet computer 142, a laptop computer 143, or the like, or any combination thereof. In some embodiments, the mobile device 141 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 140 may be part of the processing device 120.

The network 150 may include any suitable network that can facilitate the exchange of information and/or data for the imaging system 100. In some embodiments, one or more components of the image acquisition device 110 (e.g., a CT device, an MRI device), the terminal(s) 140, the processing device 120, the storage device 130, etc., may communicate information and/or data with one or more other components of the imaging system 100 via the network 150. For example, the processing device 120 may obtain data from the image acquisition device 110 via the network 150. As another example, the processing device 120 may obtain user instructions or user inputs from the terminal(s) 140 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the imaging system 100 may be connected to the network 150 to exchange data and/or information.

It should be noted that the above description of the imaging system 100 is merely provided for illustration, and not intended to limit the scope of the present disclosure. For persons having ordinary skills in the art, multiple variations and modifications may be made under the teachings of the present disclosure. For example, the assembly and/or function of the imaging system 100 may be varied or changed according to specific implementation scenarios.

FIG. 2 is a schematic diagram illustrating hardware and/or software components of an exemplary computing device 200 according to some embodiments of the present disclosure. The computing device 200 may be used to implement any component of the imaging system 100 as described herein. For example, the processing device 120 and/or the terminal(s) 140 may be implemented on the computing device 200, respectively, via its hardware, software program, firmware, or a combination thereof. Although only one such computing device is shown, for convenience, the computer functions relating to the imaging system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (program codes) and perform functions of the processing device 120 in accordance with techniques described herein. The computer instructions may include, for example, routines, programs, objects, components, signals, data structures, procedures, modules, and functions, which perform particular functions described herein. For example, the processor 210 may process data obtained from the image acquisition device 110, the terminal(s) 140, the storage device 130, and/or any other component of the imaging system 100. In some embodiments, the processor 210 may include one or more hardware processors, such as a microcontroller, a microprocessor, a reduced instruction set computer (RISC), an application-specific integrated circuit (ASIC), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the image acquisition device 110, the terminal(s) 140, the storage device 130, or any other component of the imaging system 100. In some embodiments, the storage 220 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the processing device 120 and the image acquisition device 110, the terminal(s) 140, or the storage device 130. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G, etc.), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
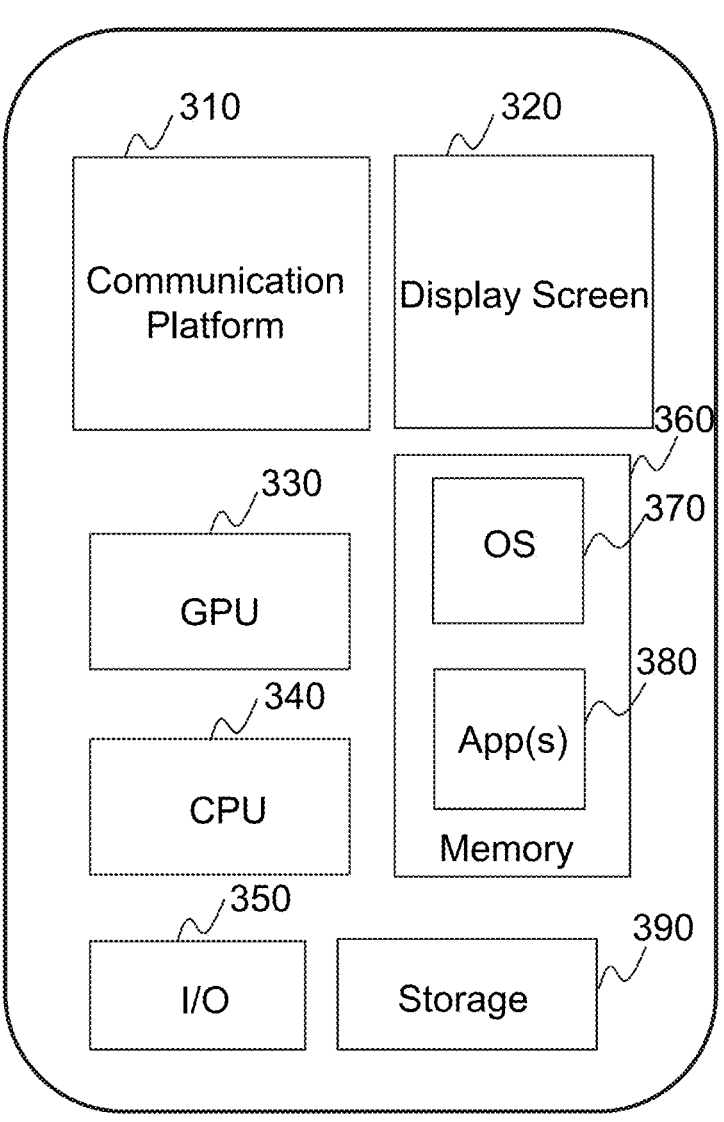
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device 300 according to some embodiments of the present disclosure. In some embodiments, one or more terminals 140 and/or a processing device 120 may be implemented on a mobile device 300, respectively.

As illustrated in FIG. 3, the mobile device 300 may include a communication platform 310, a display screen 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 to be executed by the CPU 340. The applications 380 may include a browser or any other suitable mobile apps for receiving and rendering information relating to image data acquisition or other information from the processing device 120. User interactions with the information stream may be achieved via the I/O 350 and provided to the processing device 120 and/or other components of the imaging system 100 via the network 150.

To implement various modules, units, and functionalities described in the present disclosure, computer hardware platforms may be used as the hardware platform(s) for one or more of the elements described herein. The hardware elements, operating systems and programming languages of such computers are conventional, and it is presumed that those skilled in the art are adequately familiar therewith to adapt those technologies for image data acquisition as described herein. A computer with user interface elements may be used to implement a personal computer (PC) or another type of work station or terminal device, although a computer may also act as a server if appropriately programmed. It is believed that those skilled in the art are familiar with the structure, programming, and general operation of such computer equipment and as a result, the drawings should be self-explanatory.

Figure 4A:
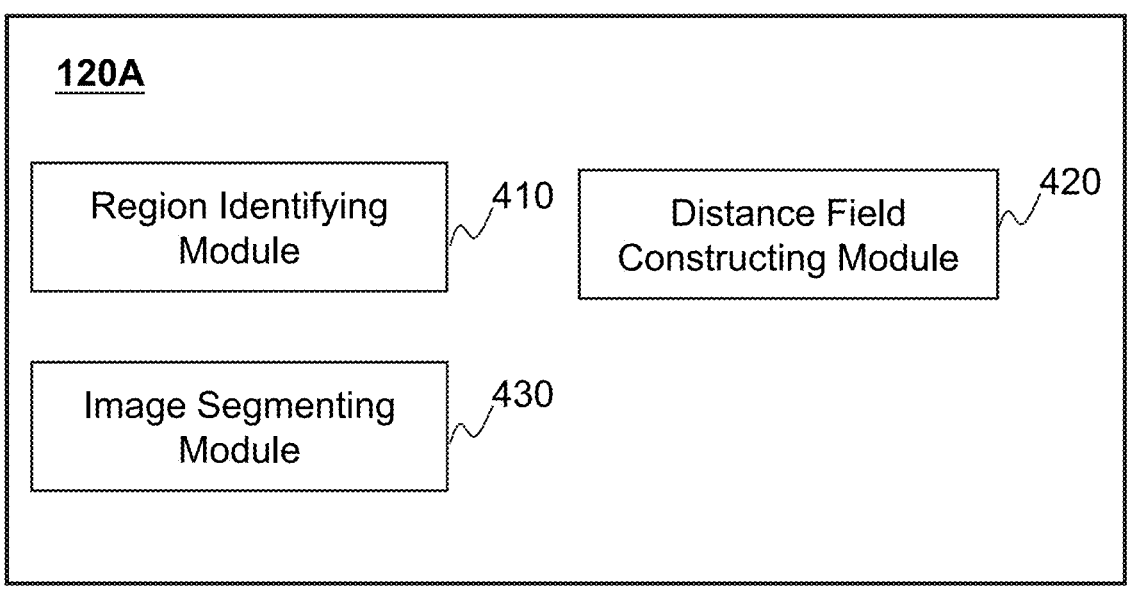
FIG. 4A is a block diagram illustrating an exemplary processing device according to some embodiments of the present disclosure.
Figure 4B:
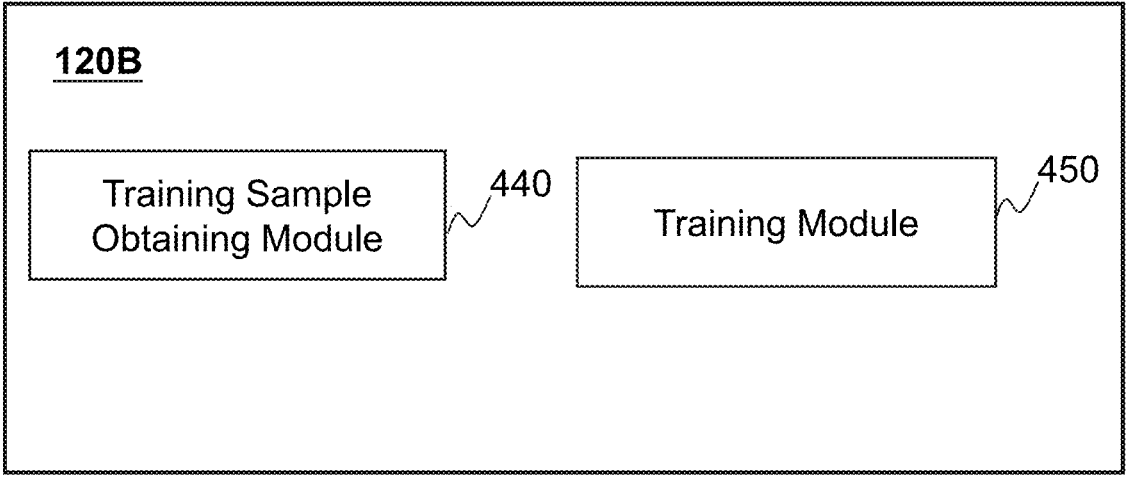
FIG. 4B is a block diagram illustrating an exemplary processing device according to some embodiments of the present disclosure.

FIG. 4A and FIG. 4B are block diagrams illustrating exemplary processing devices 120A and 120B according to some embodiments of the present disclosure. In some embodiments, the processing devices 120A and 120B may be embodiments of the processing device 120 as described in connection with FIG. 1. In some embodiments, the processing devices 120A and 120B may be respectively implemented on a processing unit (e.g., the processor 210 illustrated in FIG. 2 or the CPU 340 as illustrated in FIG. 3). Merely by way of example, the processing devices 120A may be implemented on a CPU 340 of a terminal device, and the processing device 120B may be implemented on a computing device 200. Alternatively, the processing devices 120A and 120B may be implemented on a same computing device 200 or a same CPU 340. For example, the processing devices 120A and 120B may be implemented on a same computing device 200.

As illustrated in FIG. 4A, the processing device 120A may include a region identifying module 410, a distance field constructing module 420, and an image segmenting module 430.

The region identifying module 410 may be configured to identify a target region of an image. In some embodiments, the target region of the image may include a tubular structure to be segmented.

The distance field constructing module 420 may be configured to construct a distance field of the target region based on a trained model. For example, the distance field constructing module 420 may determine a plurality of sub-regions of the target region. As another example, the distance field constructing module 420 may determine a sub-distance field by inputting the sub-region into the trained model. As still another example, the distance field constructing module 420 may construct the distance field of the target region based on the plurality of sub-distance fields.

The image segmenting module 430 may be configured to segment the tubular structure to obtain a segmented tubular structure based on the distance field and an optimum path algorithm. For example, the image segmenting module 430 may determine a growth condition based on the distance field. As another example, the image segmenting module 430 may determine the segmented tubular structure by performing a region growing procedure on the target centerline based on the growth condition.

As illustrated in FIG. 4B, the processing device 120B may include a training sample obtaining module 440 and a training module 450.

The training sample obtaining module 440 may be configured to obtain a plurality of training sample sets. In some embodiments, each of the plurality of training sample sets may include a sample image and a sample distance field of the sample image.

The training module 450 may be configured to obtain the trained model by training a preliminary model based on the plurality of training sample sets.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. For example, some other components/modules (e.g., a storage module) may be added into and/or omitted from the processing devices 120A and 120B. As another example, the processing device 120A and the processing device 120B may be integrated into one processing device 120. In some embodiments, the processing device 120A and/or the processing device 120B may share two or more of the modules, and any one of the modules may be divided into two or more units.

FIG. 5 is a flowchart illustrating an exemplary process 500 for processing an image according to some embodiments of the present disclosure. In some embodiments, process 500 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 500. The operations of the illustrated process presented below are intended to be illustrative. In some embodiments, the process 500 may be accomplished with one or more additional operations not described and/or without one or more of the operations discussed. Additionally, the order of the operations of the process 500 illustrated in FIG. 5 and described below is not intended to be limiting.

In 502, the processing device 120A (e.g., the region identifying module 410) may identify a target region of an image.

In some embodiments, the target region of the image may include a tubular structure to be segmented. In some embodiments, the image may be a medical image obtained from the image acquisition device 110 (e.g., a PET scanner, a PET-CT scanner, a MR scanner, etc.), or from a storage device (e.g., a picture archiving and communication system (PACS), the storage device 150, the storage device 220, and/or the storage 390). The image may include a CT image, a PET image, an MM image, an ultrasound image, or the like, or any combination thereof. As used herein, a tubular structure refers to a structure that represents a real structure of a subject shown in the image. For example, the real structure of the subject may be a blood vessel, a trachea, a coronary artery, etc., or a human, which may be shown as a tubular structure in the image.

In some embodiments, after obtaining the image, the processing device 120A may first automatically segment the image to obtain an original segmented tubular structure of the image according to an automatic segmentation algorithm. Such automatic segmentation algorithm may include a threshold-based algorithm, a region-based algorithm, a region growing algorithm, a watershed algorithm, an edge-detection-based algorithm, a wavelet-analysis (and/or wavelet transform)-based algorithm, a genetic algorithm, an active-contours-based algorithm, a feature encoder-based algorithm, a regional-proposal-based algorithm, or the like, or any combination thereof. In some embodiments, the original segmented tubular structure may be rough. Based on the original segmented tubular structure, a user (e.g., an operator or a doctor, etc.) may input at least one seed point (also referred to as edit point) on the original segmented tubular structure via a user terminal (e.g., the terminal(s) 140, the I/O 230, the I/O 350, etc.). The location or vicinity of each of the at least one seed point may include an unsegmented part of the tubular structure, which is not identified by the automatic segmentation algorithm.

In some embodiments, the processing device 120A may obtain the at least one seed point, and identify the target region based on the at least one seed point. For example, the processing device 120A may identify an area associated with the at least one seed point as the target region. For example, the processing device 120A may identify a smallest area that includes all of the at least one seed point as the target region. As another example, the processing device 120A may identify an area that is certain times (e.g., 1.5 times, 2 times, 3 times, etc.) as large as the smallest area, and designate the identified area as the target region. The identified area and the smallest area may be concentric. For example, the processing device 120A may obtain 4 seed points from the user, and identify a smallest area that includes the 4 seed points. The processing device 120A may further identify, based on a center of the smallest area, an area that is 1.5 times as large as the smallest area, and designate the identified area as the target region. As another example, the processing device 120A may obtain only one seed point from the user, and identify an area that is centered on the one seed point, and designate the identified area as the target region.

In 504, the processing device 120A (e.g., the distance field constructing module 420) may construct a distance field of the target region based on a trained model.

In some embodiments, the distance field may include elements (e.g., pixels, voxels) each of which is associated with a distance between the element and a predicted centerline of the tubular structure. For example, the closer of an element to the predicted centerline, the greater value (e.g., a pixel value, a brightness value, etc.) of the element. In some embodiments, an element of the distance field may correspond to an element (e.g., pixel, voxel) in the target region. For example, the target region includes 3×3 pixels in a pixel array. The distance field of the target region may also include 3×3 elements in an element array. Each of the 3×3 pixels may correspond to an element of the 3×3 elements at a same location of the pixel array and the element array.

In some embodiments, the trained model may be a process or an algorithm for processing the target region to obtain the distance field. In some embodiments, the trained model may be a deep learning model or a neural network model. For example, the trained model may include a Vnet model, a Unet model, a Convolutional Neural Networks (CNN) model, a Recurrent Neural Network (RNN) model, a Generative Adversarial Network (GAN) model, a CycleGAN model, a pix2pix model, or the like, or any combination thereof. In some embodiments, the trained model may be trained offline. For example, the trained model may be trained and stored in a storage device (e.g., the storage device 130, the storage 220, the storage 390, etc.) of the imaging system 100. The processing device 120A may access the storage device to retrieve the conversion model for processing the target region. Alternatively, the trained model may be trained in real-time. For example, the processing device 120B may train the trained model before using the trained model. Exemplary processes for obtaining the trained model may be found elsewhere (e.g., FIG. 10 and the descriptions thereof) of the present disclosure.

In some embodiments, the processing device 120A may input the target region into the trained model. The output of the trained model may include the distance field. In some embodiments, the processing device 120A may divide the target region into a plurality of sub-regions, and construct the distance field based on the plurality of sub-regions. For example, the processing device 120A may input each of the plurality of sub-regions into the trained model, and determine a sub-distance field for each of the plurality of sub-regions. The processing device 120A may combine the plurality of sub-distance fields to construct the distance field of the target region. Exemplary processes for constructing the distance field of the target region may be found elsewhere (e.g., FIG. 8 and the descriptions thereof) of the present disclosure.

In 506, the processing device 120A (e.g., the image segmenting module 430) may segment the tubular structure to obtain a segmented tubular structure based on the distance field and an optimum path algorithm.

In some embodiments, the processing device 120A may determine a target centerline of the tubular structure based on the distance field and the optimum path algorithm. For example, the processing device 120A may determine, based on the distance field and the optimum path algorithm, an optimum path. The optimal path may include the at least one seed point. For example, the processing device 120A may select one seed point from the at least one seed point as a starting point. The processing device 120A may search, from the starting point, an optimum path that passes through all of the at least one seed point based on the distance field according to the optimum path algorithm. In some embodiments, the distance field may be used to constrain the optimal path so that the optimum path is at the centerline of the tubular structure. Exemplary optimum path algorithm may include an A-Star (A*) algorithm, a FLOYD algorithm, a JOHNSON algorithm, a DIJKSTRA algorithm, or the like, or any combination thereof.

Figure 6:
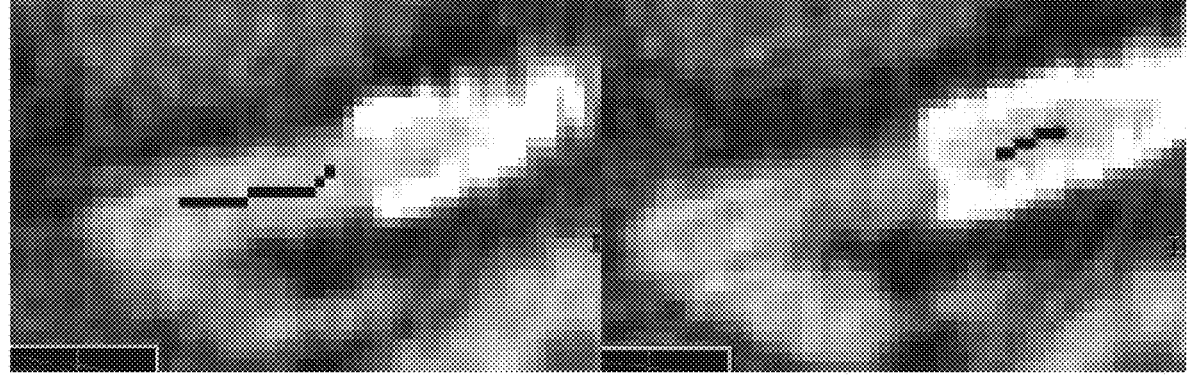
FIG. 6 illustrates exemplary image slices displaying a target centerline of a tubular structure according to some embodiments of the present disclosure.

In some embodiments, the processing device 120A may designate the optimum path as the target centerline of the tubular structure. FIG. 6 illustrates exemplary image slices displaying a target centerline of a tubular structure according to some embodiments of the present disclosure. As shown in FIG. 6, the target centerline is shown as a black line. In some embodiments, the processing device 120A may segment the tubular structure to obtain the segmented tubular structure based on the target centerline and the distance field. For example, the processing device 120A may obtain a distance between each element and the predicted centerline from the distance field. The processing device 120A may segment the tubular structure based on the distance between each element and the target centerline. For example, from the target centerline, the processing device 120A may identify an element (e.g., a pixel, a voxel) in the image that has a distance equal to the obtained distance from the distance field, and segment the tubular structure from the identified element. As another example, the processing device 120A may determine a growth condition based on the distance field, and determine the segmented tubular structure by performing a region growing procedure on the target centerline based on the growth condition. Exemplary processes for determining the segmented tubular structure may be found elsewhere (e.g., FIG. 9 and the descriptions thereof) of the present disclosure.

Figure 7:
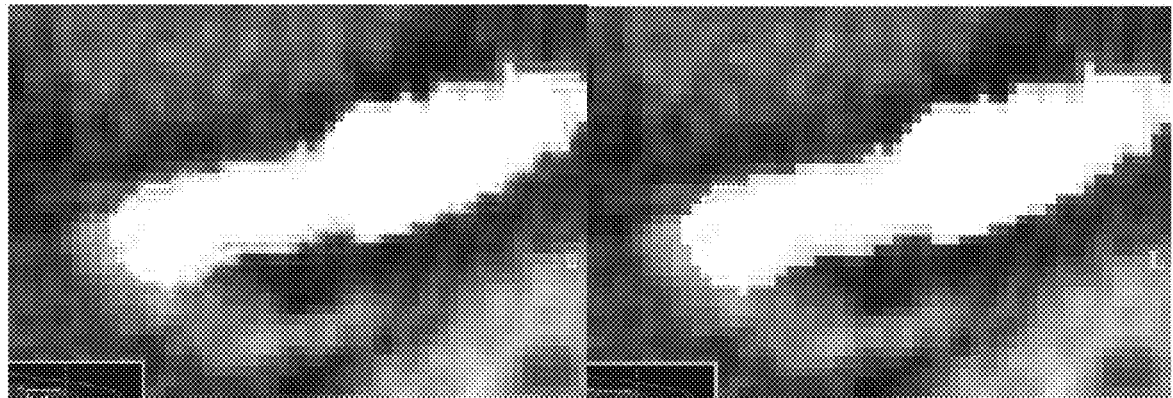
FIG. 7 illustrates exemplary image slices displaying a segmented tubular structure according to some embodiments of the present disclosure.

In some embodiments, the segmented tubular structure may be part of the tubular structure of the image, which is displayed on the target region of the image. The processing device 120A may combine the original segmented tubular structure and the segmented tubular structure of the target region to obtain a segmentation result of the whole image. FIG. 7 illustrates exemplary image slices displaying a segmented tubular structure according to some embodiments of the present disclosure. As shown in FIG. 7, the segmented tubular structure is shown as a white region.

In some embodiments, after determining the segmented tubular structure, the processing device 120A may determine an optimum segmented tubular structure by processing the segmented tubular structure. For example, the processing device 120A may marginalize the segmented tubular structure to obtain the optimum segmented tubular structure.

According to the embodiments of the present disclosure, determining the distance field of the target region based on the trained model may solve the problem that it is difficult to segment a tubular structure (e.g., a coronary artery) around some positions, such as a bifurcation of the coronary artery, the adherence of veins, etc. Further, by combining the optimum path algorithm and the distance field, searching an error path or failing to search for an optimum path is effectively avoided, thereby obtaining an accurate segmentation result. In addition, the process 500 for processing an image may also be applied to other segmentation techniques, such as a single point tracking algorithm, a seed-point-based segmentation algorithm, etc., thereby having general applicability.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added in the process 500. The processing device 120A may store information and/or data (e.g., the segmented tubular structure) in a storage device (e.g., the storage device 130, the storage 220, the storage 390, etc.) of the imaging system 100.

FIG. 8 is a flowchart illustrating an exemplary process 800 for constructing a distance field of a target region according to some embodiments of the present disclosure. In some embodiments, process 800 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 800. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting.

In 802, the processing device 120A (e.g., the distance field constructing module 420) may determine a plurality of sub-regions of the target region.

In some embodiments, the processing device 120A may divide the target region into the plurality of sub-regions according to a predetermined size. For example, the image to be segmented is a 3D image, and the target region of the image is a block. The processing device 120A may divide the target region according to the predetermined size (e.g., 0.5 mm×0.5 mm×0.5 mm). Each of the plurality of sub-regions may be a size of 0.5 mm×0.5 mm×0.5 mm. In some embodiments, the processing device 120A may divide the target region according to a plurality of predetermined sizes. For example, a size of a first sub-region of the plurality of sub-regions may be different from a size of a second sub-region of the plurality of sub-regions.

In 804, for each sub-region of the plurality of sub-regions, the processing device 120A (e.g., the distance field constructing module 420) may determine a sub-distance field by inputting the sub-region into the trained model. In some embodiments, the output of the trained model corresponding to each sub-region may include a sub-distance field.

In 806, the processing device 120A (e.g., the distance field constructing module 420) may construct the distance field of the target region based on the plurality of sub-distance fields. For example, the processing device 120A may combine the plurality of sub-distance fields according to the relative positions of each of the corresponding sub-regions to obtain a combined distance field. In some embodiments, after obtaining the combined distance field, the processing device 120A may normalize the combined distance field to obtain the distance field of the target region. For example, a value (e.g., a pixel value, a voxel value) of an element (e.g., a pixel, a voxel) at the centerline of the tubular structure may be normalized as 1, and decrease out along the centerline until a value of an element is 0. As another example, the processing device 120A may normalize the combined distance field according to Equation (1):

$$g(x) = \exp(3 * (1 - m(x))) - 1 \qquad (1),$$

where g(x) denotes a cost function of the distance field, and m(x) denotes a weight of the combined distance field. A cost value of an element at the centerline of the tubular structure may be less than a cost value of an element far from the centerline.

According to the embodiments of the present disclosure, dividing the target region into a plurality of sub-regions to construct the distance field may reduce the calculation amount each time for using the trained model, thereby improving computational efficiency. In addition, the normalized distance field may provide an inconsistent calculation rule for determining the optimum path, thereby improving the computational efficiency of the optimum path.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added in the process 800. The processing device 120A may store information and/or data (e.g., the distance field) in a storage device (e.g., the storage device 130, the storage 220, the storage 390, etc.) of the imaging system 100.

FIG. 9 is a flowchart illustrating an exemplary process 900 for determining a segmented tubular structure according to some embodiments of the present disclosure. In some embodiments, process 900 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 900. The operations of the illustrated process presented below are intended to be illustrative. In some embodiments, the process 900 may be accomplished with one or more additional operations not described and/or without one or more of the operations discussed. Additionally, the order of the operations of process 900 illustrated in FIG. 9 and described below is not intended to be limiting.

In 902, the processing device 120A (e.g., the image segmenting module 430) may determine a growth condition based on the distance field.

In some embodiments, the growth condition may include a step length, a growth stop condition, or the like, or any combination thereof. In some embodiments, the step length may be determined based on the distance field. For example, the step length may be determined based on a resolution of the distance field. For example, a distance between two adjacent elements (e.g., two adjacent pixels, two adjacent voxels) may be designated as the step length. For example, if the distance between two adjacent elements is 4 mm, the step length may be 4 mm. In some embodiments, the growth stop condition may include that a growth region satisfies a predetermined condition. For example, a growing process may stop when all of the at least one seed point inputted by the user is included in a current growth region. The growth stop condition may be that when all of the at least one seed point inputted by the user is included in a current growth region, the growth process stops. As another example, the growing process may stop when a value (e.g., a pixel value, a bright value) of a current element equals a predetermined value. For example, the growth stop condition may be that when the pixel value of the current element is 0.2, the growth process stops. In some embodiments, the growth condition may be predetermined and stored in a storage device (e.g., the storage device 130, the storage 220, the storage 390, etc.) of the imaging system 100. Alternatively, the growth condition may be determined in real-time. For example, the processing device 120A may determine the growth condition after determining the distance field.

In 904, the processing device 120A (e.g., the image segmenting module 430) may determine the segmented tubular structure by performing a region growing procedure on the target centerline based on the growth condition.

In some embodiments, the processing device 120A may perform the region growing procedure on the target centerline based on the step length and the growth stop condition. For example, the processing device 120A may perform the region growing procedure and include elements each of which has a similar value (e.g., a pixel value, a gray value, an intensity, etc.) as each seed point into a growth region by increasing every step length from each of the at least one seed point of the target centerline. As used herein, two elements that have similar values refer that a difference between the two values of the two elements is less than a predetermined threshold (e.g., 0.1, 0.01, etc.). Until the growth stop condition is satisfied, the processing device 120A may stop growing and the growth region when the growth process stops may be designated as the segmented tubular structure.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added in the process 900. The processing device 120A may store information and/or data (e.g., the segmented tubular structure) in a storage device (e.g., the storage device 130, the storage 220, the storage 390, etc.) of the imaging system 100.

FIG. 10 is a flowchart illustrating an exemplary process 1000 for obtaining a trained model according to some embodiments of the present disclosure. In some embodiments, process 1000 may be implemented as a set of instructions (e.g., an application) stored in the storage device 130, storage 220, or storage 390. The processing device 120, the processor 210 and/or the CPU 340 may execute the set of instructions, and when executing the instructions, the processing device 120, the processor 210 and/or the CPU 340 may be configured to perform the process 900. The operations of the illustrated process presented below are intended to be illustrative. In some embodiments, the process 1000 may be accomplished with one or more additional operations not described and/or without one or more of the operations discussed. Additionally, the order of the operations of process 1000 illustrated in FIG. 10 and described below is not intended to be limiting. In some embodiments, the trained model described in connection with operation 504 in FIG. 5 may be obtained according to the process 1000. In some embodiments, the process 1000 may be performed by another device or system other than the imaging system 100, e.g., a device or system of a vendor or a manufacturer of the trained model. For illustration purposes, the implementation of the process 1000 by the processing device 120B is described as an example.

In some embodiments, each of the plurality of training sample sets may include a sample image and a sample distance field of the sample image. In a training sample set, the sample distance field may be determined based on the sample image of the training sample set. In some embodiments, the processing device 120B may obtain a plurality of sample images. For each of the plurality of sample images, the processing device 120B may determine a sample distance filed. In some embodiments, for each of the plurality of sample images, the processing device 120B may determine a sample original segmented tubular structure. For example, the processing device 120B may automatically segment the sample image to obtain a sample original segmented tubular structure of the sample image according to an automatic segmentation algorithm. Exemplary automatic segmentation algorithms may be found elsewhere (e.g., FIG. 5 and the descriptions thereof) of the present disclosure. In some embodiments, the processing device 120B may determine or obtain a sample processed segmented tubular structure by processing the sample original segmented tubular structure. In some embodiments, the processing device 120B may process the sample original segmented tubular structure according to any existing segmentation algorithm. Alternatively, the sample processed segmented tubular structure may be manually processed by a user (e.g., a doctor, an operator). In some embodiments, the processing device 120B may determine the sample distance field based on the sample processed segmented tubular structure. For example, based on the sample processed segmented tubular structure, the processing device 120B may identify a sample centerline of a sample tubular structure, and determine a distance between each sample element in the sample processed segmented tubular structure and the sample centerline to obtain the sample distance field. FIG. 11 illustrates exemplary sample distance fields according to some embodiments of the present disclosure. As shown in FIG. 11, the closer of a sample element to the sample centerline, the greater value (e.g., a pixel value, a brightness value, etc.) of the sample element.

In 1004, the processing device 120B (e.g., the training module 450) may obtain the trained model by training a preliminary model based on the plurality of training sample sets.

In some embodiments, the preliminary model refers to a process, an algorithm, or a model to be trained. The preliminary model may be of any type of model (e.g., a machine learning model, a deep learning model) as described elsewhere in the present disclosure (e.g., FIG. 5 and the relevant descriptions). In some embodiments, the processing device 120B may obtain the preliminary model from one or more components of the imaging system 100 (e.g., the storage device 130, storage 220, the storage 390, or an external source via a network (e.g., the network 150)).

Figure 12:
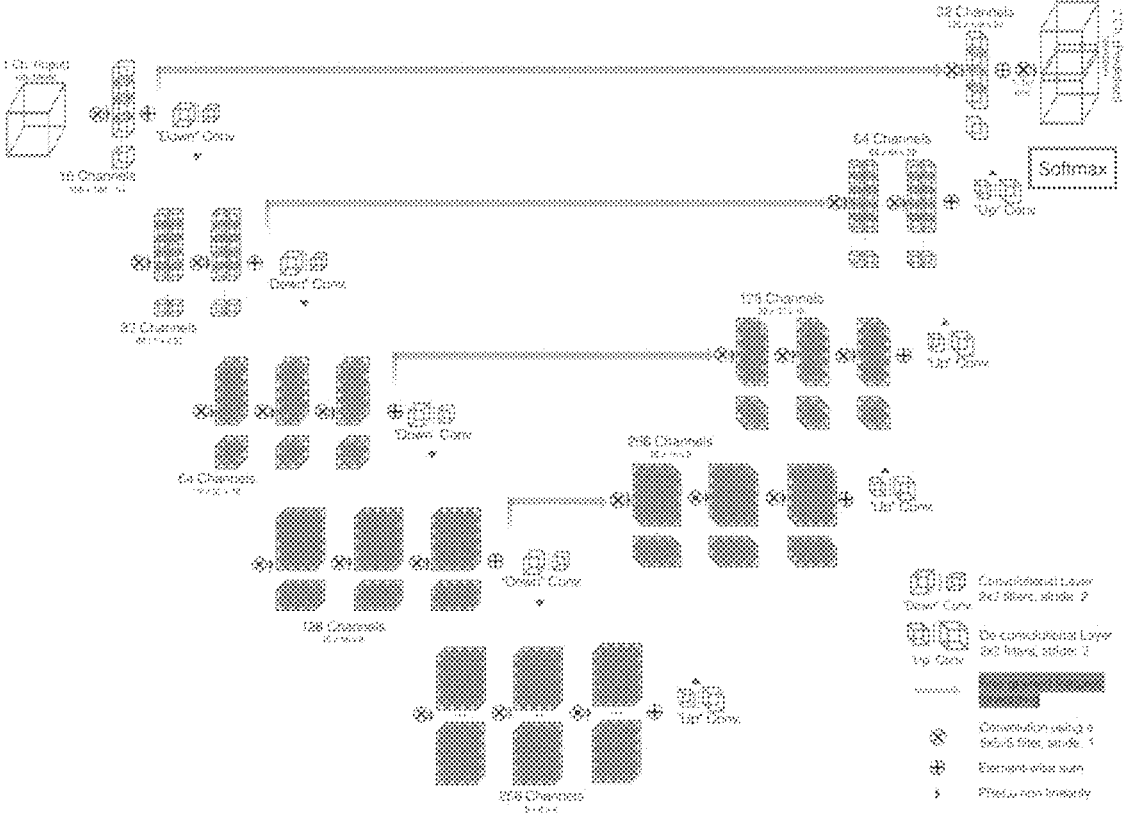
FIG. 12 illustrates an exemplary Vnet model according to some embodiments of the present disclosure.

The preliminary model may include a plurality of model parameters. For example, the preliminary model may be a Vnet model. FIG. 12 illustrates an exemplary Vnet model according to some embodiments of the present disclosure. In some embodiments, the training of the preliminary model may include one or more iterations to iteratively update model parameters of the preliminary model based on the plurality of training sample sets until a termination condition is satisfied in a certain iteration. Exemplary termination conditions may be that the value of a loss function obtained in the certain iteration is less than a threshold value, that a certain count of iterations has been performed, that the loss function converges such that the difference of the values of the loss function obtained in a previous iteration and the current iteration is within a threshold value, etc.

Figure 13:
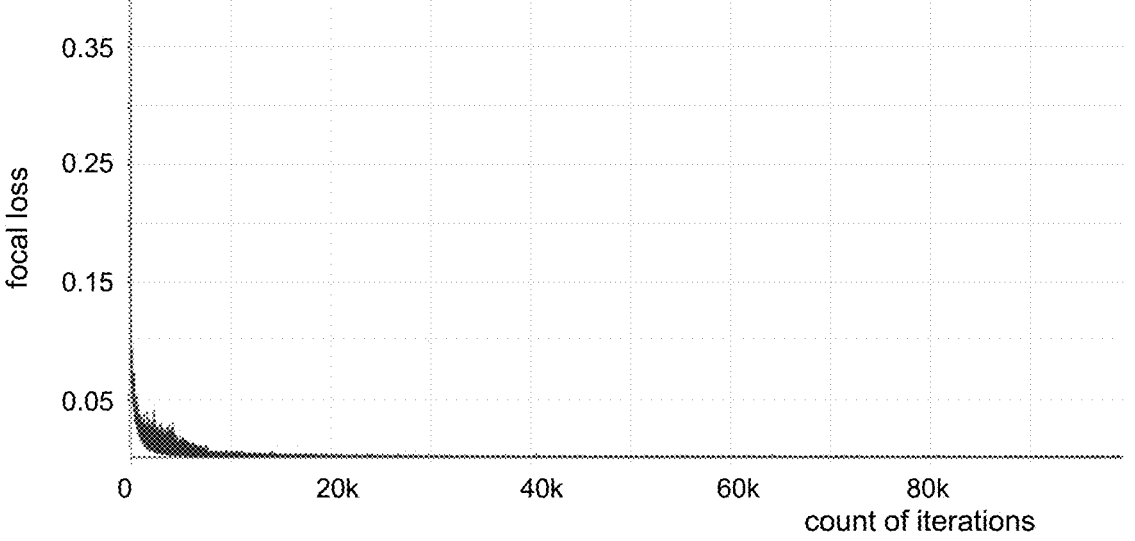
FIG. 13 illustrates an exemplary loss function according to some embodiments of the present disclosure.

Merely by way of example, an updated preliminary model generated in a previous iteration may be evaluated in the current iteration. The loss function may be used to measure a discrepancy between a predicted distance field output by the updated preliminary model in the current iteration and the sample distance field. For example, each training sample set may include a sample image and a sample distance field of the sample image. The sample image of the training sample set may be inputted into the updated preliminary model, and the updated preliminary model may output a distance field. The loss function may be used to measure a difference between the predicted distance field and the sample distance field of each training sample set. Exemplary loss functions may include a normalized exponential function, a focal loss function, a log loss function, a cross-entropy loss, a squared error loss function, a Dice loss, a L1 loss function, a L2 loss function, or the like. In some embodiments, the plurality of training sample sets may include positive training sample sets (e.g., sample tubular structures in the sample images) and negative training sample sets (e.g., background other than the sample tubular structures in the sample images). A count ratio of a count of the positive training sample sets to a count of the negative training sample sets may be a predetermined ratio (e.g., 10:1). FIG. 13 illustrates an exemplary loss function according to some embodiments of the present disclosure. In some embodiments, the loss function may reduce the weight of the negative training sample sets in the training process, and solve the imbalance of positive training sample sets and negative training sample sets.

If the termination condition is not satisfied in the current iteration, the processing device 120B may further update the updated preliminary model to be used in a next iteration according to, for example, a backpropagation algorithm. If the termination condition is satisfied in the current iteration, the processing device 120B may designate the updated preliminary model in the current iteration as the trained model.

It should be noted that the above description is merely provided for illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added in the process 1000. The processing device 120A may store information and/or data (e.g., the trained model) in a storage device (e.g., the storage device 130, the storage 220, the storage 390, etc.) of the imaging system 100.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python, or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. The latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An image processing system, comprising:
at least one storage device including a set of instructions; and
at least one processor in communication with the at least one storage device, wherein when executing the set of instructions, the at least one processor is directed to cause the system to perform operations including:

obtaining an original segmented tubular structure of an image by automatically segmenting the image according to an automatic segmentation algorithm;

obtaining, on the original segmented tubular structure, at least one seed point input by a user via a user terminal;

identifying a target region of the image based on the at least on seed point, wherein the target region includes a tubular structure to be segmented;

constructing a distance field of the target region based on a trained model, wherein the distance field includes elements each of which is associated with a distance between the element and a predicted centerline of the tubular structure; and segmenting the tubular structure to obtain a segmented tubular structure based on the distance field and an optimum path algorithm.

2. The image processing system of claim 1, wherein a location or a vicinity of each of the at least one seed point includes an unsegmented part of the tubular structure, and the unsegmented part of the tubular structure is not identified by the automatic segmentation algorithm.

3. The image processing system of claim 2, wherein the segmenting the tubular structure to obtain the segmented tubular structure based on the distance field and the optimum path algorithm includes:

determining a target centerline of the tubular structure based on the distance field and the optimum path algorithm; and segmenting the tubular structure to obtain the segmented tubular structure based on the target centerline and the distance field.

4. The image processing system of claim 3, wherein the determining the target centerline of the tubular structure based on the distance field and the optimum path algorithm includes:

determining, based on the distance field and the optimum path algorithm, an optimum path including the at least one seed point; and designating the optimum path as the target centerline of the tubular structure.

5. The image processing system of claim 4, wherein the determining, based on the distance field and the optimum path algorithm, the optimum path including the at least one seed point includes:

selecting one seed point from the at least one seed point as a starting point;

searching, from the starting point, the optimum path that passes through all of the at least one seed point based on the distance field according to the optimum path algorithm.

6. The image processing system of claim 3, wherein the segmenting the tubular structure to obtain the segmented tubular structure based on the target centerline and the distance field includes:

determining a growth condition based on the distance field; and determining the segmented tubular structure by performing a region growing procedure on the target centerline based on the growth condition.

7. The image processing system of claim 3, wherein the segmenting the tubular structure to obtain the segmented tubular structure based on the target centerline and the distance field includes:

obtaining a distance between each element and the predicted centerline from the distance field;

identifying an element in the image that has a distance equal to the obtained distance from the distance field; and segmenting the tubular structure from the identified element.

8. The image processing system of claim 1, wherein the constructing the distance field of the target region based on the trained model includes:

determining a plurality of sub-regions of the target region;

for each sub-region of the plurality of sub-regions, determining a sub-distance field by inputting the sub-region into the trained model; and constructing the distance field of the target region based on the plurality of sub-distance fields.

9. The image processing system of claim 1, wherein the operations further include:

determining an optimum segmented tubular structure by processing the segmented tubular structure.

10. The image processing system of claim 1, wherein the trained model is obtained by a process including:

obtaining a plurality of training sample sets each of which includes a sample image and a sample distance field of the sample image; and obtaining the trained model by training a preliminary model based on the plurality of training sample sets.

11. The image processing system of claim 10, wherein the obtaining the plurality of training sample sets includes:

obtaining a plurality of sample images;

for each sample image of the plurality of sample images, determining a sample distance filed.

12. The image processing system of claim 11, wherein for each sample image of the plurality of sample images, the determining the sample distance field includes:

for each sample image of the plurality of sample images, determining a sample original segmented tubular structure;

determining a sample processed segmented tubular structure by processing the sample original segmented tubular structure; and determining the sample distance field based on the sample processed segmented tubular structure.

13. The image processing system of claim 1, wherein the trained model includes a Vnet model.

14. An image processing method, comprising:

identifying a target region of an image, wherein the target region includes a tubular structure to be segmented;

constructing a distance field of the target region based on a trained model, wherein the distance field includes elements each of which is associated with a distance between the element and a predicted centerline of the tubular structure; and segmenting the tubular structure to obtain a segmented tubular structure based on the distance field and an optimum path algorithm.

15. The image processing method of claim 14, wherein the identifying the target region of the image includes:

obtaining at least one seed point; and identifying the target region based on the at least one seed point.

16. The image processing method of claim 15, wherein the segmenting the tubular structure to obtain the segmented tubular structure based on the distance field and the optimum path algorithm includes:

determining a target centerline of the tubular structure based on the distance field and the optimum path algorithm; and segmenting the tubular structure to obtain the segmented tubular structure based on the target centerline and the distance field.

17. The image processing method of claim 16, wherein the determining the target centerline of the tubular structure based on the distance field and the optimum path algorithm includes:

determining, based on the distance field and the optimum path algorithm, an optimum path including the at least one seed point; and designating the optimum path as the target centerline of the tubular structure.

18. The image processing method of claim 16, wherein the segmenting the tubular structure to obtain the segmented tubular structure based on the target centerline and the distance field includes:

determining a growth condition based on the distance field; and determining the segmented tubular structure by performing a region growing procedure on the target centerline based on the growth condition.

19. A non-transitory computer readable medium, comprising executable instructions that, when executed by at least one processor, direct the at least one processor to perform a method, the method comprising:

obtaining an original segmented tubular structure of an image by automatically segmenting the image according to an automatic segmentation algorithm;

obtaining at least one seed point input by a user via a user terminal;

identifying a target region of the image, wherein the target region includes a tubular structure to be segmented;

constructing a distance field of the target region based on a trained model, wherein the distance field includes elements each of which is associated with a distance between the element and a predicted centerline of the tubular structure; and segmenting the tubular structure to obtain a segmented tubular structure based on the distance field and an optimum path algorithm.

* * * * *